UNITED STATES PATENT OFFICE.

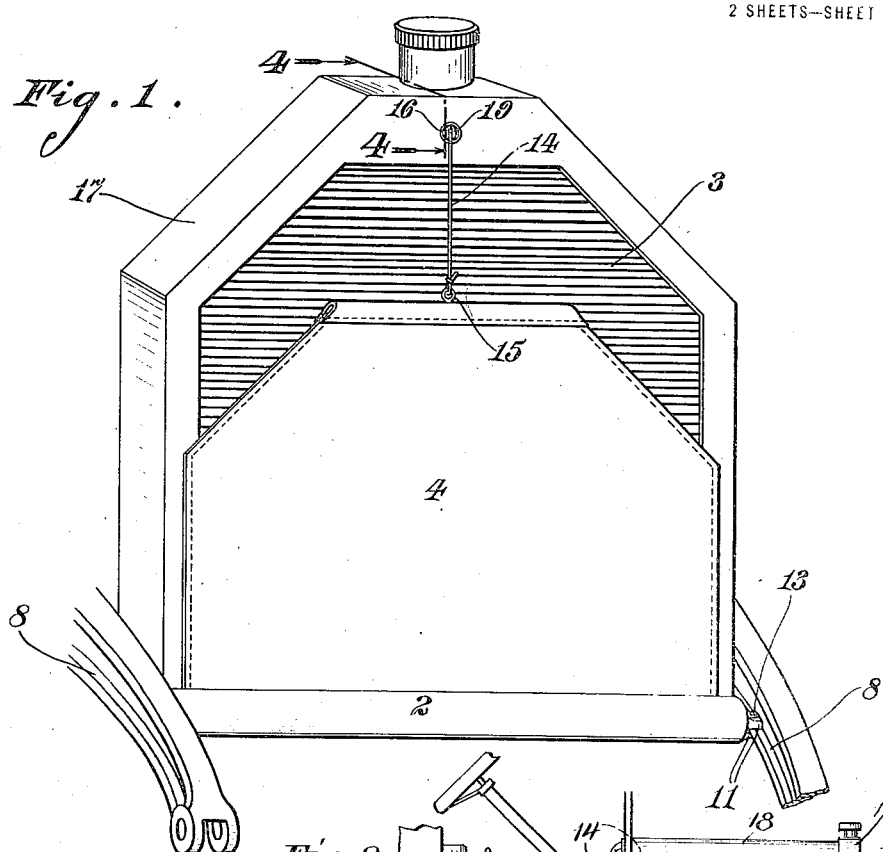
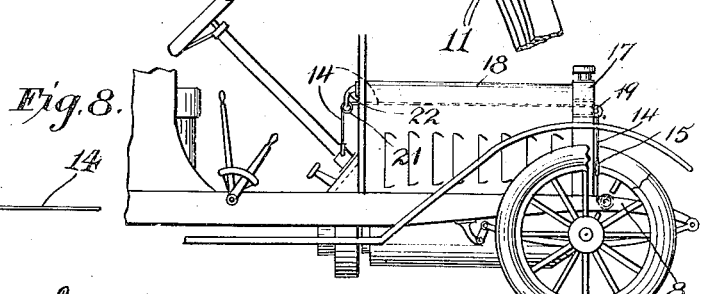
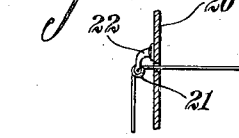
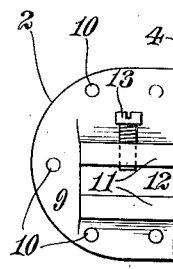
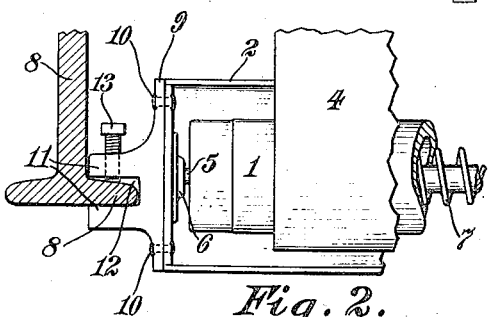
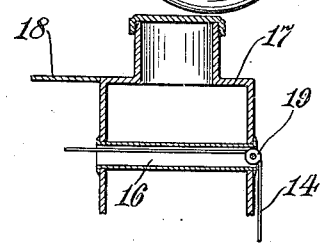

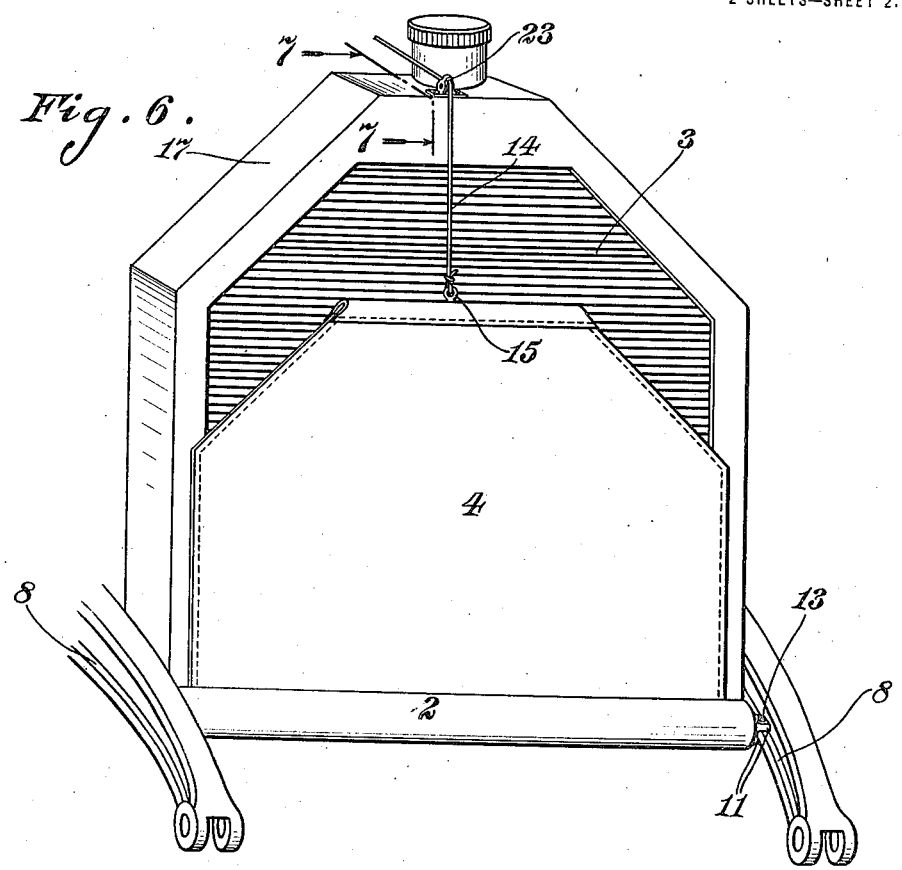
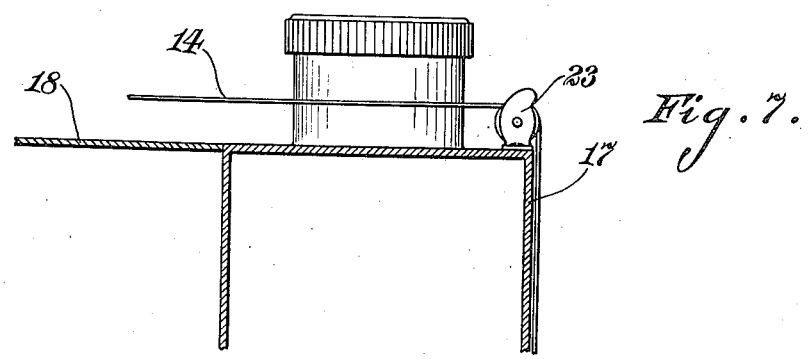

WILLIAM STEIN, OF ST. LOUIS, MISSOURI.

AUTOMOBILE RADIATOR-PROTECTOR.

1,165,461.  Specification of Letters Patent.  Patented Dec. 28, 1915.

Application filed February 20, 1914. Serial No. 819,974.

*To all whom it may concern:*

Be it known that I, WILLIAM STEIN, a citizen of the United States, residing at the city of St. Louis, State of Missouri, have invented certain new and useful Improvements in Automobile Radiator - Protectors, of which the following is a specification.

This invention relates to improvements in automobile radiator protectors, the object of the invention being to control, from the driver's seat within an automobile, the passage of air from without to the radiator and engine in order to prevent the dissipation of the heat of the radiator and engine, and to protect the radiator and engine from the wind and from exposure to cold air while the vehicle is standing idle or is in use, thus preventing freezing of the water within the radiator while the same is exposed to a low temperature, facilitating the starting of the engine by keeping the radiator and engine warm while the engine is not operating, and, furthermore, facilitating the operation of the engine by providing a means for regulating and controlling the passage of cold air to the engine and radiator of the vehicle.

It is well known that in automobiles, when exposed in cold weather, the engines become excessively cool and fail to give efficient service because of the uncontrolled rush of cold air from without to the engines, and, furthermore, when automobiles are left standing out of doors or elsewhere exposed to low temperature the water in the radiators may freeze thus causing the radiators to burst, or the engines when not operating may become so cold as to require numerous crankings at great expense of wear and tear on automatic starters or at great expense of labor on the part of drivers starting the engine by hand-operated cranks, with the additional unsatisfactory result that the engines even after having been started will not operate properly until they have been warmed up by running, which in cold weather is often long delayed because of the uncontrolled rush of cold air through the radiators to the engines and which, therefore, interferes with the efficiency of the engines.

The present invention provides an economical and easily attached means, adjustable from the driver's seat of an automobile, to prevent the water in the radiator from freezing, to prevent at all times the engine from becoming excessively cool, and thus tending to maintain conditions favorable to efficient service from the engine.

By the present invention, it is possible to start the engine with the curtain-shield extended to cover the front of the radiator, and as the engine becomes heated, to gradually lower the curtain shield by degrees, from the driver's seat without necessitating the stopping of the automobile and alighting therefrom.

In the accompanying drawings, forming part of this specification, in which like numbers of reference denote like parts wherever they occur, Figure 1 is a front perspective view of a radiator and part of a chassis of an automobile equipped with a form of this automobile radiator protector showing a means for operating same and a preferred mode of attaching it to the chassis; Fig. 2 is a view from the rear of a portion of the spring roller of this invention with a portion of the radiator protecting means partially unrolled therefrom, the casing inclosing the roller, and means for detachably securing one end of said casing by a bracket and set screw to the chassis of an automobile; Fig. 3 is an end view of the casing, the bracket attaching means, and a portion of the protecting shield partially unrolled from the roller contained in said casing; Fig. 4 is a sectional view on the line 4—4, Fig. 1, showing a preferred form of the means for passing the flexible member for raising and lowering the radiator protector through the radiator toward the dashboard of an automobile; Fig. 5 is a side view of a preferred form of means for supporting the flexible member relative to the dashboard, the latter being shown in section; Fig. 6 is a view of parts of an automobile similar to those shown in Fig. 1, illustrating an alternate form of means for passing the flexible member attached to the radiator protector to the driver's seat of the automobile; Fig. 7 is a sectional view on the line 7—7, Fig. 6; and Fig. 8 is a plan view looking at the side of a fragment of an automobile equipped with a radiator protector embodying this invention and showing the relation of the driver's seat to parts of said protector.

The spring-roller 1, which is of the usual construction used for window curtains except that the locking dogs are omitted, operates within and is protected by a casing 2, which may be of any desired shape or construction, but in the drawings is shown of semi-cylindrical shape or approximating semi-cylindrical shape, said casing 2 having an open back turned toward the radiator 3 through which open back the radiator protector passes as it rolls and unrolls upon the roller 1. The roller 1 is preferably hung within the casing 2 (as shown in Fig. 2) by means of a nipple 5 attached to the center of each end face of the roller 1 or made part thereof and which nipple 5 is inserted into a plate 6 attached to or made part of each inside end of the casing 2, each plate 6 having a suitable means for receiving the nipple and affording bearing points therefor upon which the roller 1 revolves under tension of the spring 7. The casing 2 is preferably detachably secured to the chassis 8 of the automobile by means of a member 9, consisting of a bracket or similar device attached to the casing 2 at each end thereof by means of screws, bolts, or rivets 10, the member 9 being constructed with projecting parallel lugs 11 forming a slot 12 fitting upon the flange of the chassis 8, the member 9 and the attached casing 2 being firmly held in place upon the flange of the chassis 8 by means of the set-screw 13 passing through a lug 11 of the member 9. The casing 2 must be located in front of the front wall of the radiator and on a line lower than its bottom, but the means for attaching the same to the chassis may be varied. The radiator protecting shield 4 is preferably a curtain made of leather, canvas, oilcloth, rubber, cravenette, material treated with rubber, asbestos, or the like, or of some similar stout flexible material, but may be of any serviceable material, and is attached to the roller 1. The roller 1 is under constant tension of its spring 7 tending to pull the shield 4 attached to the roller downward and to roll it upon the roller 1, which tendency is opposed or resisted through the flexible member 14 by means controlled by the driver from his seat in the automobile. The flexible member 14 is preferably of twine, cord, rope, wire, or a leather thong, but may be of any other suitable material, and is attached at one end to the shield 4 by means of a member 15, which member 15 may be a screw eyelet, a staple, or some other suitable attaching device, and said flexible member 14 is preferably passed through the radiator 3 by being carried through a tube or inclosed channel 16 (Fig. 1 and Fig. 4) inserted through the radiator 3 for that purpose, said tube or inclosed channel 16 being inserted through the radiator casing 17 near the top thereof and extending from the front face of said radiator casing 17, flush therewith or slightly beyond it, rearwardly, terminating flush with or slightly beyond the back of the radiator casing 17 opposite the face thereof. The tube or inclosed channel 16 serves the purpose of providing a conduit for the flexible member 14 through the radiator 3 while protecting the flexible member 14 from the water in the radiator, and the tube or inclosed channel 16 is so constructed and fitted into the radiator casing 17 and the radiator 3 that the water in the radiator will not leak out of the radiator 3 at the points where the tube or inclosed channel 16 enters or leaves the radiator 3 through the necessary perforations therefor in the radiator casing 17, or at any point along the length of the tube or inclosed channel 16 within the radiator 3. Upon leaving the tube or inclosed channel 16 rearwardly of the radiator 3, the flexible member 14 passes through the space underneath and near the top of the engine hood 18, thence through the dashboard 20 to any desired point inside the vehicle easily accessible to the driver's seat. To facilitate the operation of the flexible member 14 a pulley 19 (Fig. 4) is attached in or to the tube or inclosed channel 16 at or near the forward outlet thereof and a pulley 21 supported by a bracket 22 (Fig. 5) is fastened upon the inside of the dashboard 20 at or near the point where the flexible member 14 passes beyond the dashboard 20 within reach of the driver of the automobile. When the flexible member 14 lies in the groove of the pulley 21 the pulley 21 will revolve and the flexible member 14 may run freely upon it, but when the driver so desires he may snap the flexible member 14 from the groove of said pulley or lift it away and jam or wedge it between the side of the pulley 21 and the side of the pulley supporting bracket 22, whereby the flexible member 14 is caught and held fast. A grooved block, lip, or the like, may be substituted for the pulley 19 and for the pulley 21, and for wedging or holding the flexible member 14 at any given point in its length any suitable device such, for instance, as a bracket with a slot, catching a knot in the flexible member 14, or a hook about which the flexible member 14 may be looped or turned, or the like, may be substituted. Moreover, the pulley 19 and the pulley 21, or either of them, may be omitted.

Fig. 6 and Fig. 7 of the accompanying drawings show an alternate arrangement of the flexible member 14, wherein, instead of passing said flexible member 14 through the radiator 3 thence through the space underneath the engine hood to the driver's seat, the flexible member 14 is passed over the radiator 3 by means of a guiding member 23, preferably a pulley, thence over the engine hood and through the dashboard 20 (Fig. 5). In this alternate arrangement a pulley 21 (Fig. 5) is, also, preferably used, but any other suitable clamping, wedging, jamming, or holding means accessible to the driver from his seat in the vehicle may be substituted.

The operation of this invention is as follows: The driver of the automobile may, from his seat in the vehicle, raise the shield 4 to a position partially or entirely covering the front of the radiator 3 by pulling the flexible member 14 toward himself, and, by wedging or clamping said flexible member 14 upon the pulley 21, as hereinabove described, the shield 4 is fixed at any desired elevation in front of the radiator 3 to control the flow of cold air from without to the radiator and engine or to exclude the air entirely, or thus the escape of warm air from within the radiator and the engine hood may be retarded. The shield 4 may be lowered by the driver from his seat in the vehicle by paying out the flexible member 14, so as to allow the shield 4 to retract entirely and permitting it to be rolled upon the roller 1, thus exposing the full area of the face of the radiator 3, or the shield 4 may be allowed partially to withdraw and permitted partially to roll up upon the roller 1, and the shield 4 may be temporarily fixed in such partially or entirely withdrawn position by fastening or wedging the flexible member 14 by means of the pulley 21, as hereinabove described, when sufficient of the length of the flexible member 14 has been paid or run out forwardly from the dashboard so as to lower the shield 4 to expose as much of the face of the radiator 3 as the driver may desire.

I claim:

In a device of the character described, the combination with an automobile including a chassis, radiator hood and driver's seat, of a casing of semi-circular formation having its open side disposed in advance of and adjacent to the radiator hood, semi-circular plates secured to the opposite ends of the casing, spaced ears projecting from the semi-circular plates for disposition upon opposite sides of convenient portions of said chassis, fastening elements passing through the ears and engaging said chassis for retaining the casing in its normal position, a spring actuated roller journaled in said casing with its outer side projecting beyond the open side of the casing, a curtain-shield wound upon said roller with its outer side projecting beyond the open end of the casing between said casing and the radiator hood, an operating element attached to the adjacent end of the curtain-shield and running to a point within convenient reach of the driver's seat and means mounted upon the radiator hood for guiding said operating element.

In testimony whereof I hereunto affix my signature in the presence of two witnesses.

WILLIAM STEIN.

Witnesses:
  WALTER C. GUELS,
  NANCY C. THOMAS.